(12) United States Patent
Kamath et al.

(10) Patent No.: US 11,755,611 B2
(45) Date of Patent: Sep. 12, 2023

(54) STORING AND IDENTIFYING CONTENT THROUGH CONTENT DESCRIPTORS IN A HISTORIAN SYSTEM

(71) Applicant: AVEVA Software, LLC, Lake Forest, CA (US)

(72) Inventors: Vinay T. Kamath, Rancho Santa Margarita, CA (US); Brian Kenneth Erickson, Long Beach, CA (US); Bala Kamesh Sista, Irvine, CA (US); Abhijit Manushree, Laguna Niguel, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 16/517,312

(22) Filed: Jul. 19, 2019

(65) Prior Publication Data

US 2019/0340182 A1 Nov. 7, 2019

Related U.S. Application Data

(63) Continuation of application No. 15/235,180, filed on Aug. 12, 2016, now abandoned, which is a continuation-in-part of application No. 14/833,906, filed on Aug. 24, 2015, now abandoned, which is a continuation-in-part of application No. 14/789,654, filed on Jul. 1, 2015, now abandoned, which is a continuation-in-part of application No. 14/704,661, filed on May 5, 2015, now abandoned, which is a continuation-in-part of application No. 14/704,666, filed on May 5, 2015, now abandoned.

(Continued)

(51) Int. Cl.
*G06F 16/25* (2019.01)
*G06F 16/907* (2019.01)
*G06F 16/909* (2019.01)
*G06F 16/178* (2019.01)
*G06F 16/908* (2019.01)

(52) U.S. Cl.
CPC ........ *G06F 16/258* (2019.01); *G06F 16/1794* (2019.01); *G06F 16/907* (2019.01); *G06F 16/908* (2019.01); *G06F 16/909* (2019.01)

(58) Field of Classification Search
CPC .. G06F 16/258; G06F 16/907; G06F 16/1794; G06F 16/908; G06F 16/909
See application file for complete search history.

(56) References Cited

U.S. PATENT DOCUMENTS 6,332,163 B1 * 12/2001 Bowman-Amuah ........................ H04L 12/4604 709/217
6,442,565 B1 * 8/2002 Tyra ........................ G06F 9/542

(Continued)

*Primary Examiner* — Alford W Kindred
*Assistant Examiner* — Lin Lin M Htay
(74) *Attorney, Agent, or Firm* — Greenberg Traurig, LLP

(57) ABSTRACT

Annotating content, comprising data values of one or more tags corresponding to a process device within a continuous process, with content descriptors in a historian system. Content descriptors enable indexing and saving content within a search service database for later retrieval by search strings that match the content descriptors. Content having one or more common content descriptors are retrieved and transmitted to a client computing device via a communications network for displaying in a dashboard on the client computing device.

13 Claims, 7 Drawing Sheets

Related U.S. Application Data

(60) Provisional application No. 62/092,051, filed on Dec. 15, 2014, provisional application No. 61/988,731, filed on May 5, 2014.

(56) References Cited

U.S. PATENT DOCUMENTS

| | | | |
|---|---|---|---|
| 2002/0069218 A1* | 6/2002 | Sull | G11B 27/28 715/202 |
| 2002/0120685 A1* | 8/2002 | Srivastava | G06F 16/958 709/203 |
| 2003/0074360 A1* | 4/2003 | Chen | H04L 67/10 |
| 2003/0120817 A1* | 6/2003 | Ott | H04L 12/1859 709/249 |
| 2006/0294086 A1* | 12/2006 | Rose | G06F 16/313 |
| 2008/0313282 A1 | 12/2008 | Warila et al. | |
| 2011/0119287 A1* | 5/2011 | Chen | G06F 16/2457 707/768 |
| 2011/0119396 A1* | 5/2011 | Kwon | H04N 21/2353 709/231 |
| 2011/0191445 A1* | 8/2011 | Dazzi | G06F 15/16 709/219 |
| 2011/0289140 A1 | 11/2011 | Pletter et al. | |
| 2014/0108585 A1* | 4/2014 | Barton | H04N 21/25891 709/213 |

* cited by examiner

STORING AND IDENTIFYING CONTENT THROUGH CONTENT DESCRIPTORS IN A HISTORIAN SYSTEM

CROSS-REFERENCE TO RELATED APPLICATIONS

This application is a continuation of U.S. application Ser. No. 15/235,180, filed Aug. 12, 2016, which is a continuation-in-part of U.S. patent application Ser. No. 14/833,906, filed Aug. 24, 2015, which is a continuation-in-part of U.S. patent application Ser. No. 14/789,654, filed Jul. 1, 2015, which is a continuation-in-part of U.S. patent application Ser. No. 14/704,661, filed May 5, 2015, which is a continuation-in-part of U.S. patent application Ser. No. 14/704,666, filed May 5, 2015, which claims the benefit of and priority to U.S. Provisional Patent Application No. 61/988,731, filed May 5, 2014, and U.S. Provisional Patent Application No. 62/092,051, filed Dec. 15, 2014. The entire contents all of which are hereby incorporated by reference.

TECHNICAL FIELD

Aspects of the present disclosure generally relate to the fields of networked computerized industrial control, automation systems and networked computerized systems utilized to monitor, log, and display relevant manufacturing/production events and associated data, and supervisory level control and manufacturing information systems. Such systems generally execute above a regulatory control layer in a process control system to provide guidance to lower level control elements such as, by way of example, programmable logic controllers or distributed control systems (DCSs). Such systems are also employed to acquire and manage historical information relating to processes and their associated outputs. More particularly, aspects of the present disclosure relate to systems and methods for storing and preserving content corresponding to gathered data and ensuring that the stored content is accessible when necessary.

BACKGROUND

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Data from these sensors and other elements results in potentially millions of tags and/or other industrial data content stored in one or more databases. Conventional techniques for searching and retrieving this data rely on entry of a source, tag name, engineering unit, and/or other extended property of data. These techniques require knowledge of tag properties and only return data for a single tag.

SUMMARY

Aspects of the disclosure permit retrieval of content comprised of one or more tag data values through creation of content descriptors describing content. Moreover, aspects of the disclosure provide secure storage of the content descriptors and efficient indexed searching of content via the content descriptors.

In an aspect, a historian system includes a processor, a memory device coupled to the processor, a network connection coupled to the processor and memory device, and a content descriptor search index module comprised of processor-executable instructions stored in the memory device. When executed by the processor, the content descriptor search index module receives content descriptors for content via the network connection and formats the received content descriptors into a language-independent data format. The content descriptors are data values of tags corresponding to process devices within a continuous process, and the content descriptors describe the content. The content descriptor search index module, when executed by the processor, also queues the formatted content descriptors in an indexing queue and indexes the formatted content descriptors as they are dequeued from the indexing queue and stored in a database. The indexes enable the content descriptors to be found in the database. When executed by the processor, the content descriptor search index module additionally provides selected content corresponding to one or more of the process devices within the continuous process based on the content descriptors found in the database.

In another aspect, a method for creating content descriptor metadata in a historian system includes a historian computing device coupled to a communications network receiving content descriptors for content via the communications network. The content includes data values of tags corresponding to a process device within a continuous process, and the content descriptors describe the content. The method also includes the historian computing device formatting the received content descriptors into a language-independent data format and queueing the formatted content descriptors in an indexing queue. The historian computing device also indexes the formatted content descriptors within a database as the formatted content descriptors are dequeued from the indexing queue. The indexes enable the content descriptors to be found in the database and selected content to be retrieved based on the content descriptors found in the database. The selected content corresponds to one or more process devices within the continuous process.

In yet another aspect, a method for retrieving content in a historian system includes a historian computing device coupled to a communications network receiving a request for retrieval of data via the communications network. The request includes at least one content descriptor. The historian computing device searches a search index for the content descriptor and locates content in a database based on a result of searching the search index. The located content includes data values of tags corresponding to a process device within a continuous process. The historian computing device also retrieves the located content from the database and provides the retrieved content to a client computing device via the communications network in response to the request. Providing the retrieved content causes the client computing device to display the retrieved content.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
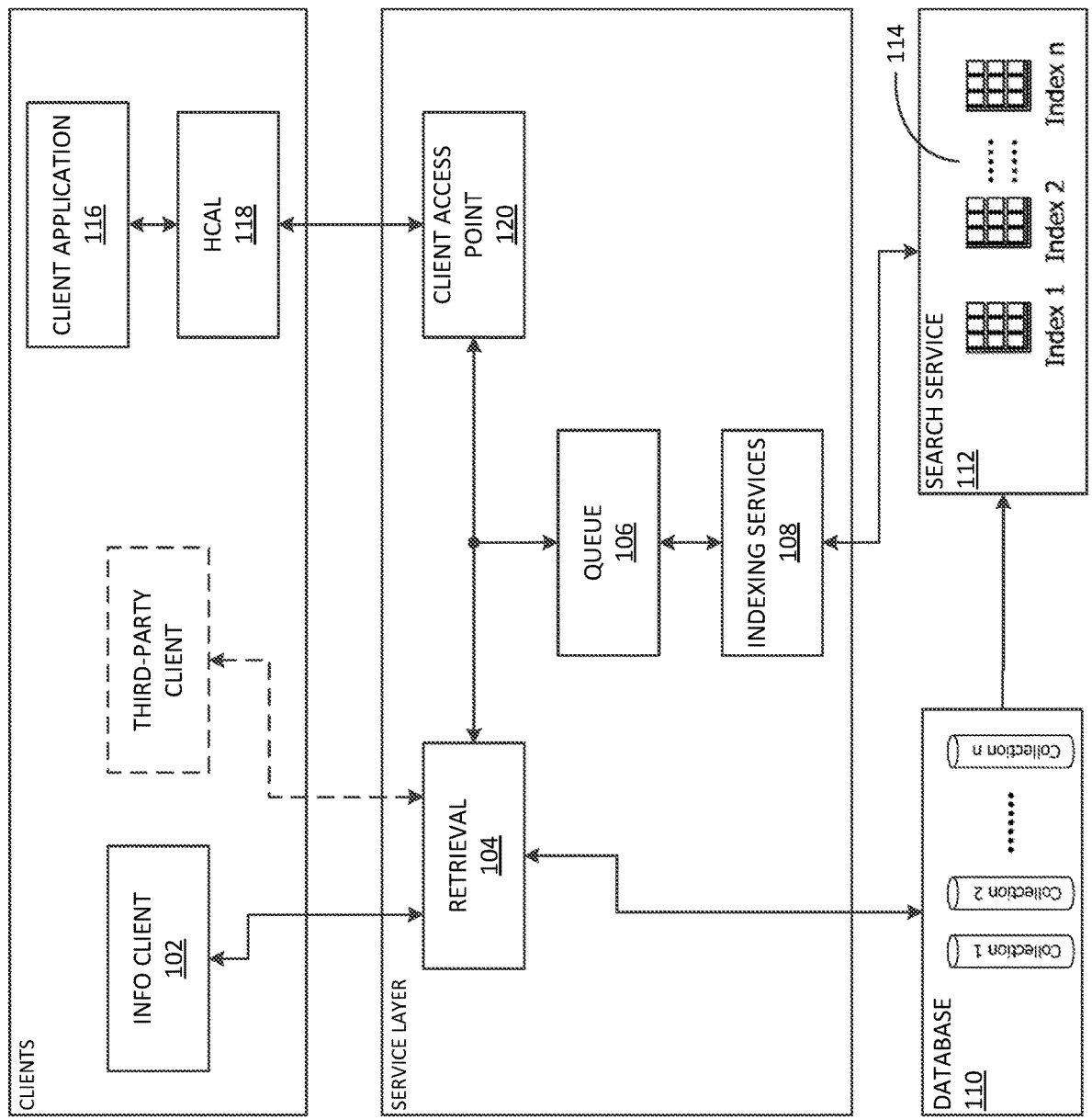
FIG. 1 illustrates an exemplary diagram of the structure of a historian system comprising elements for implementing content descriptors according to an embodiment.

FIG. 1 illustrates an exemplary embodiment of a historian system, generally indicated at 100, with content descriptors. The system 100 includes an information, or info, client 102, a retrieval module 104, a queue 106, indexing services 108, a database 110, a search service 112, indexes 114, a client application 116, a historian client access layer (HCAL) 118, and a client access point module 120.

In an embodiment, the info client 102 is a web client that can create content descriptors and then search existing content stored in database 110 using the content descriptors as search terms. For example, info client 102 may include an online insight client (e.g., Wonderware Online Insight) and/or a historian insight client. In another embodiment, info client 102 may additionally or alternatively include a third-party client. The info client 102 creates content descriptors in response to user entries, as further described herein. In an embodiment, info client 102 uses representational state transfer (REST) application programming interfaces (APIs) to create content descriptors and retrieve content. The info client 102 connects to a historian service layer of system 100 through retrieval module 104.

The info client 102 formats content descriptors into a language-independent data format, such as JavaScript Object Notation (JSON) document. An exemplary, non-limiting JSON document structure includes:

```
{
    "__messageid" : "message_unique_id",
    "__tenantid" : "tenant_id",
    "__body" : [
        {
            "__id" : "document_unique_id",
            "__keywords" : [
                "weather trend"
                "weather analysis"
            ],
            "__contenttype" : "SavedContent|Tag|User",
            "__fields" : [
                {
                    "ContentName" : "East coast weather trend",
                    "__analyzers" : "nGram"
                }
            ],
            "__operation" : "Create|Update|Upsert|Delete|DeleteAll"
        }
    ]
}
```

The following table describes, in one illustrative and non-limiting embodiment, the fields of the exemplary JSON document structure.

| Name | Mandatory (Yes/No) | Description | Supported format/values |
|---|---|---|---|
| __messageid | Yes | Unique message identifier to track the indexing status of the message | Any string |
| __tenantid | Yes | Tenant's unique identifier | Guid |
| __id | Yes | Unique identifier for the document | Any string |
| __keywords | No | Keywords associated to the content. All keywords will be indexed and are nGram analyzed to support substring search. | List of string values |
| __contenttype | Yes | Defines the type of document. | Saved content, tag, user |
| __fields | No | Additional fields to be indexed for the document. Field name provided here will be returned as the search response matching field. | Only string fields are indexed |
| __analyzers | No | Analyzers are applied on fields. These analyzers are used to analyze field values for supporting substring search. | nGram analyzer |
| __operation | Yes | Action requested on the document. | Create - create a new document. Update - modify an existing document. Delete - delete an existing document. Upsert - Create or update a document. DeleteAll - deletes all documents of a particular content type. |

Additional exemplary JSON documents are described in Appendix A.

The retrieval module 104 facilitates adding content descriptors to queue 106. The retrieval module 104 also accesses database 110 to retrieve content in response to search requests. Aspects of retrieval module 104 are further described herein and in U.S. patent application Ser. No. 14/833,906, incorporated by reference above. The queue 106 holds messages comprised of content descriptors until the messages are indexed in search service 112 by indexing services 108.

The indexing services 108 as shown in FIG. 1 index the content descriptors on queue 106 in indexes 114 of search service 112. In an embodiment, the status of indexing processes performed by indexing services 108 is logged to an "IndexingStatus" table in search service 112. For example, the status will be logged as "Inprogress" when a message is read from queue 106, and the status will be updated accordingly when the indexing process is complete. The following table describes the columns of the exemplary "IndexingStatus" table:

| Column Name | Description |
| --- | --- |
| PartitionKey | Tenant ID will be the partition key |
| RowKey | Message ID will be the row key |
| Status | Value of status could be any of: Failed, Inprogress, PartiallySucceeded, Succeeded |
| Message | Empty value for Inprogress or Succeeded status. In case of Failed or PartiallySucceeded, a JSON document with collection of failed document IDs with failure reason |

Once the data is indexed, it is available for searching. The search service 112 enables retrieval of stored content by matching content descriptor (e.g., content name, keyword, etc.) and/or other properties. In an embodiment, search service 112 permits faster and more efficient searching of stored content by content descriptors. An exemplary search service 112 includes the Azure search service available from Microsoft Corp. One having ordinary skill in the art will understand that any search service and queue are within the scope of the present disclosure. In an embodiment, retrieving search results exposes the REST API, which can be used by any application and is platform neutral.

Referring further to FIG. 1, the client application 116 connects to the historian service layer through HCAL 118. The HCAL 118 communicates with the client access point module 120 to create and access content descriptors. In an embodiment, client access point module 120 handles connections with multiple client applications 116.

In an embodiment, the system 100 includes a communications infrastructure (e.g., communications network) capable of facilitating the exchange of data among various components of system 100. The communications infrastructure may include a local area network (LAN) that is connectable to other telecommunications networks, including other LANs or portions of the Internet or an intranet. The communications infrastructure may also be any telecommunications network that facilitates the exchange of data, such as those that operate according to the IEEE 802.3 (e.g., Ethernet) and/or the IEEE 802.11 (e.g., Wi-Fi) protocols, for example. In other embodiments, the communications infrastructure is any medium that allows data to be physically transferred through serial or parallel communication channels (e.g., copper wire, optical fiber, computer bus, wireless communication channel, etc.). In an embodiment, the communications infrastructure comprises at least in part a process control network. In another embodiment, the communications infrastructure comprises at least in part a SCADA system.

Figure 2:
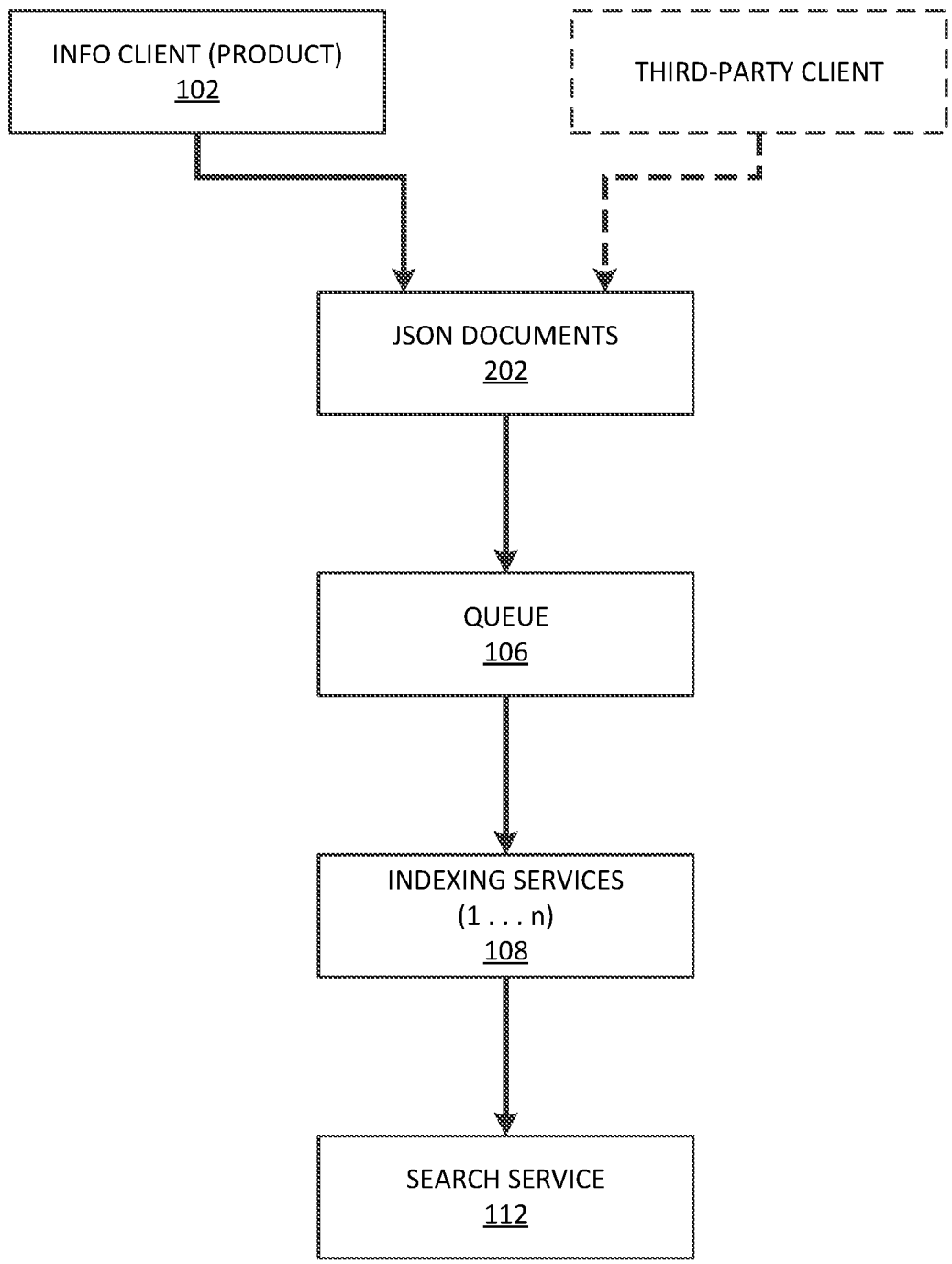
FIG. 2 illustrates an exemplary content descriptor storage operation according to an embodiment.

FIG. 2 illustrates an exemplary content descriptor storage operation of system 100. As part of the indexing process, info client 102 provides content descriptors in a language-independent data format, such as a JavaScript Object Notation (JSON) document 202. The formatted content descriptors are then placed onto queue 106 as messages. The search service 112 periodically polls queue 106 and processes stored messages for indexing. In an embodiment, more than one content name and keywords are queued (e.g., an array of JSON documents in one queue message). In another embodiment, messages on queue 106 are limited to 64 kilobytes.

Figure 3:
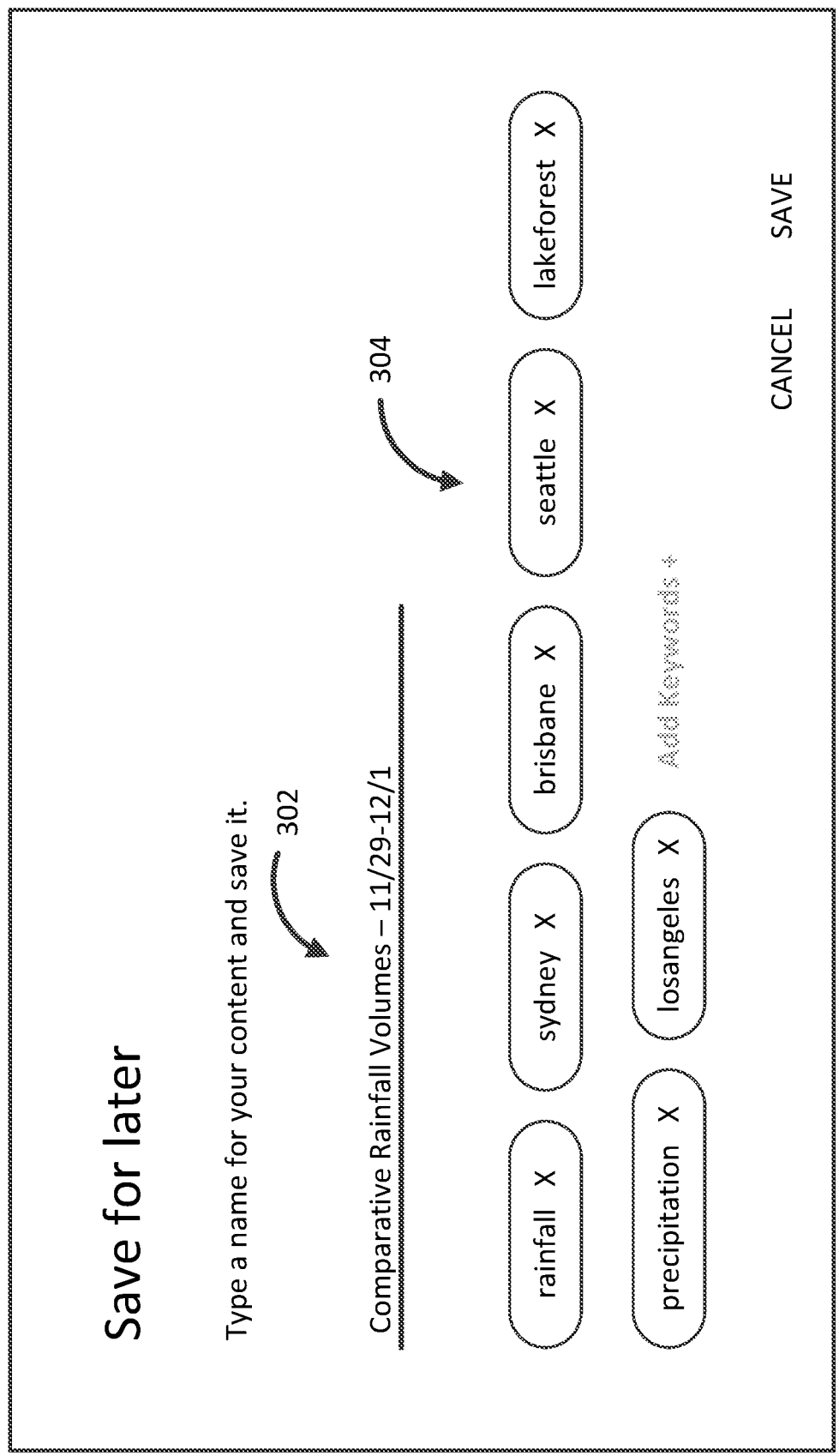
FIG. 3 illustrates an exemplary graphical user interface for storing content descriptors according to an embodiment.

FIG. 3 illustrates an exemplary graphical user interface (GUI) 300 of info client 102 for storing content descriptors. In an embodiment, GUI 300 is displayed on a display device of a computing device, such as a mobile device, tablet, smartphone, laptop, workstation, and the like. The GUI 300 enables a user to store content in database 110 and indexed with one or more content descriptors (e.g., content name and/or a keyword annotation of the content), which aids subsequent retrieval of the stored content. In the embodiment illustrated in FIG. 3, content descriptors include a content name 302 and keywords 304. In one form, content descriptors are created directly on the content to obviate the need to register them. Content descriptors may contain any combination of letters, numbers, and special characters. In an embodiment, spaces are not permitted in content descriptors. Content descriptors may be reused and are not connected with any particular user. In another embodiment, up to twenty content descriptors may be assigned to a particular content. The GUI 300 enables a user to annotate generated content with content descriptors that allow the content to be indexed and searched.

Figure 4:
FIG. 4 illustrates an exemplary graphical user interface for indexed searching of content descriptors according to an embodiment.

FIG. 4 illustrates an exemplary GUI 400 for indexed searching of content descriptors. In an embodiment, GUI 400 permits searching for content based on content descriptors, such as content name and keywords. For example, the embodiment illustrated in FIG. 4 is a search for content having a content descriptor of "weather." Users can distinguish the search result based on a "FieldName" property depending on whether the matching search record is a content name, keyword, tag name, or the like. In an embodiment, case (e.g., uppercase and lowercase) is disregarded when searching for content descriptors.

An exemplary search response includes:

```
{
    "odata.metadata":
"https://nchqaruntime.cloudapp.net/Historian/v1/$metadata#TagSuggest",
    "value": [
        {
            "Tags@odata.navigationLinkUrl":
```

```
"https://nchqaruntime.cloudapp.net/Historian/v1/TagSuggest(FieldName='All',Value='n'
)/Tags?$top=100&q=n",
        "Value": "n",
        "FieldName": "All",
        "Count": 100,
        "SearchRanking": 5000,
        "DisplayText": "n* (100 tags from 1 source)"
    },
    {
        "Tags@odata.navigationLinkUrl":
"https://nchqaruntime.cloudapp.net/Historian/v1/TagSuggest(FieldName='source',Valu
e='NonStreamedData')/Tags?$top=100932&q=n",
        "Value": "nature",
        "FieldName": "Keyword",
        "Count": 100932,
        "SearchRanking": 3000,
        "DisplayText": "Keyword"
    }
}
```

Figure 5:
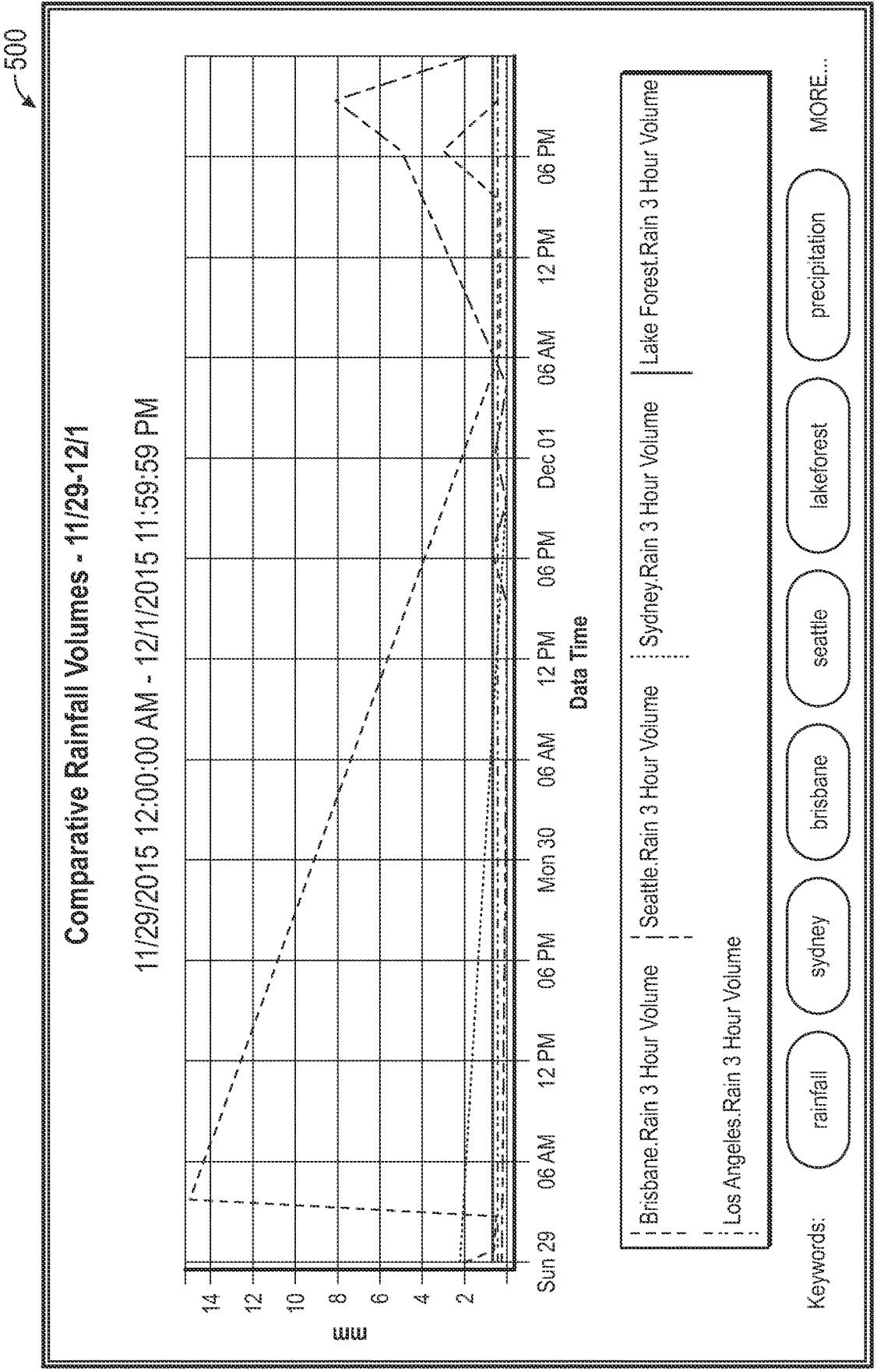
FIG. 5 illustrates an exemplary graphical user interface for presenting content described by content descriptors according to an embodiment.

FIG. 5 illustrates an exemplary GUI 500 for presenting content described by content descriptors. In the illustrated embodiment, comparative rainfall content for various cities is displayed because each content has the keyword "rainfall." In an embodiment, navigation links are provided to other content with matching keywords.

Figure 6A:
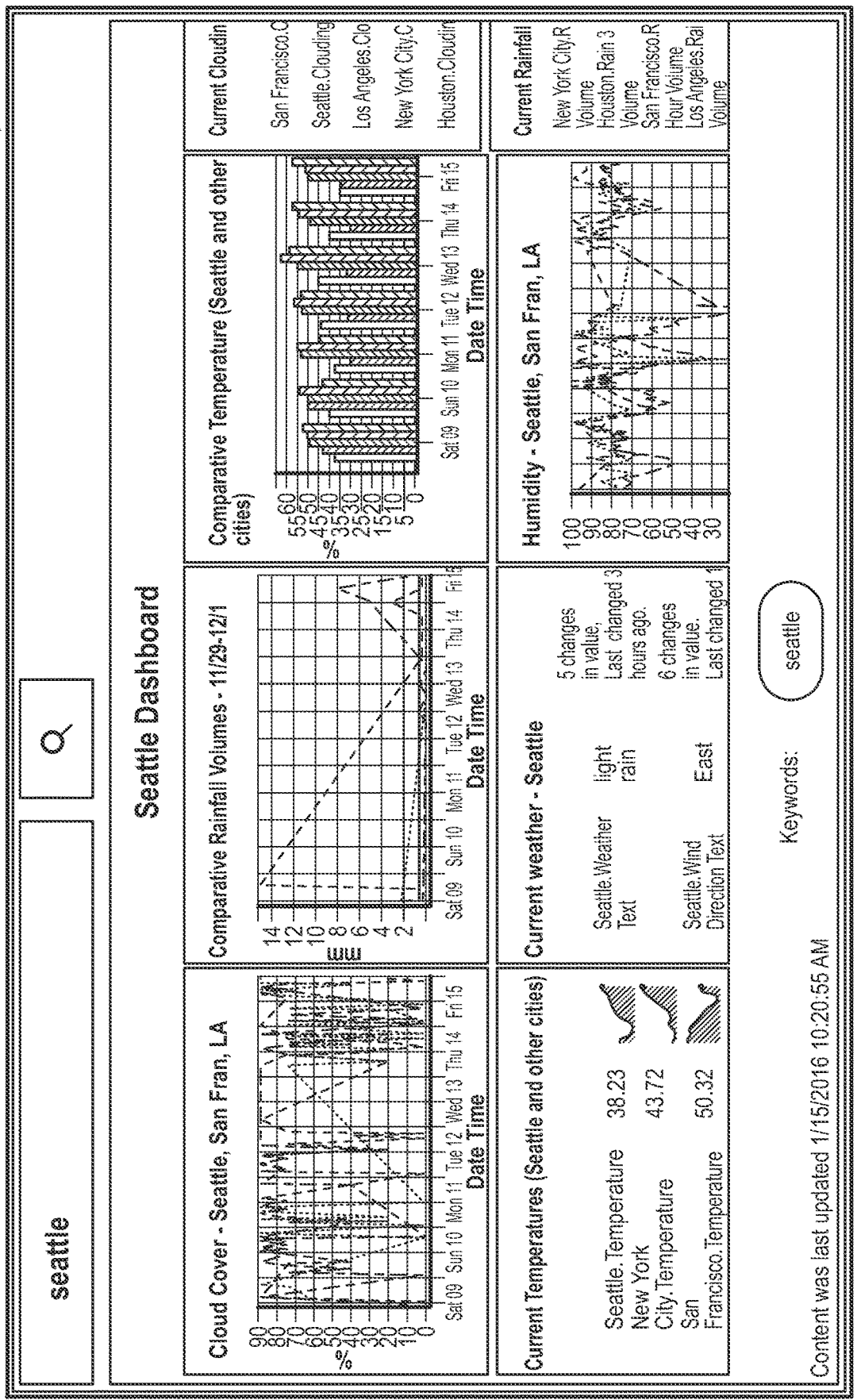
FIGS. 6A and 6B illustrate exemplary graphical user interfaces for presenting dashboards of content described by common content descriptors according to an embodiment.

FIG. 6A illustrates an exemplary GUI 600-A for presenting dashboards of content described by common content descriptors. A dashboard comprises content that has the same content descriptor (e.g. keyword) and can be displayed together in one view. Beneficially, several users can contributed to the same dashboard. The dashboard illustrated in FIG. 6A includes various content having the content descriptor "Seattle" as a common content descriptor.

Figure 6B:
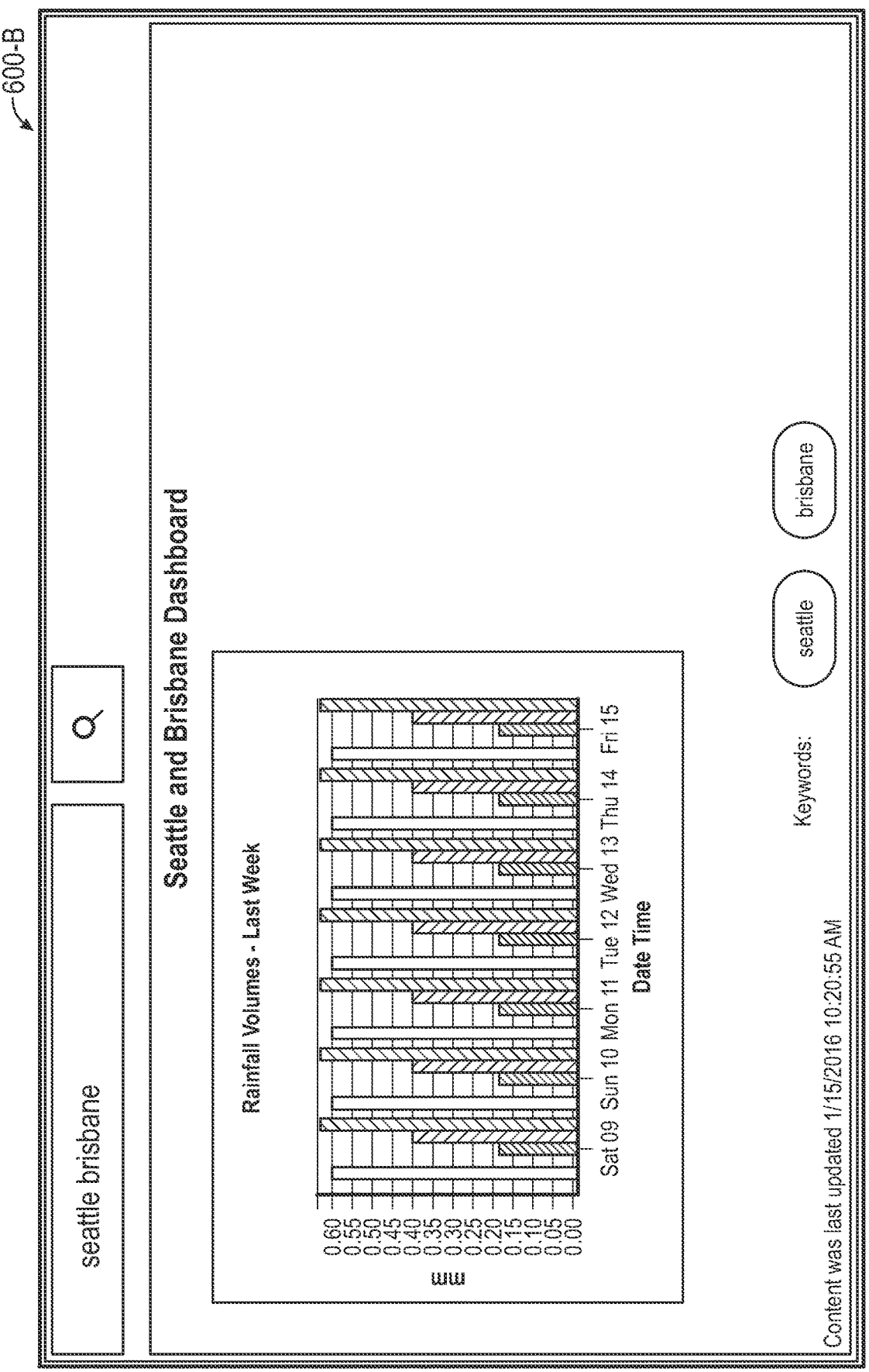

FIG. 6B illustrates an exemplary GUI 600-B for presenting a dashboard of content that contains the same set of two or more content descriptors. The dashboard in the illustrated embodiment contains content tagged with both "Brisbane" and "Seattle" content descriptors. In this manner, "Brisbane" and "Seattle" are common content descriptors. As illustrated in FIG. 6B, a bar chart of rainfall volumes for the previous week is the only content matching both the "Brisbane" and "Seattle" content descriptors in this embodiment.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

APPENDIX A

- Create saved content with 2 keywords:
```
{
    "_messageid": "message_unique_id_1",
    "_tenantid": "tenant_id_1",
    "_body": [
        {
            "_id": "document_unique_id",
            "_keywords": ["Weather", "Weather Analysis"],
            "_contenttype": "SavedContent",
            "_fields": [
                {
                    "ContentName": "West coast weather trend",
                    "_analyzers": "nGram"
                }
            ],
            "_operation": "Create"
        }
    ]
}
```
- Modify content name of existing saved content:
```
{
    "_messageid": "message_unique_id_2",
    "_tenantid": "tenant_id_1",
    "_body": [
        {
            "_id": "document_unique_id",
            "_keywords": ["Weather", "Weather Analysis"]
            "_contenttype": "SavedContent",
            "_fields": [
                {
                    "ContentName": "West coast weather analysis",
                    "_analyzers": "nGram"
                }
            ],
            "_operation": "Update"
        }
    ]
}
```
- Remove keyword from existing saved content:
```
{
    "_messageid": "message_unique_id_3",
    "_tenantid": "tenant_id_1",
    "_body": [
        {
            "_id": "document_unique_id",
            "_keywords": ["Weather"],
            "_contenttype": "SavedContent",
            "_fields": [
                {
                    "ContentName": "West coast weather analysis ",
                    "_analyzers": "nGram"
```

-continued
```
                }
            ],
            "_operation": "Update"
        }
    ]
}
```
- Delete existing saved content:
```
{
    "_messageid": "message_unique_id_4",
    "_tenantid": "tenant_id_1",
    "_body": [
        {
            "_id": "document_unique_id",
            "_contenttype": "SavedContent",
            "_operation": "Delete"
        }
    ]
}
```
- Delete all documents for a content type:
```
{
    "_messageid": "message_unique_id_5",
    "_tenantid": "tenant_id_1",
    "_body": [
        {
            "_id":"",
            "_contenttype": "SavedContent",
            "_operation": "DeleteAll"
        }
    ]
}
```
- Create multiple saved contents with keywords:
```
{
    "_messageid": "message_unique_id_6",
    "_tenantid": "tenant_id_1",
    "_body": [
        {
            "_id": "document_unique_id_1",
            "_keywords": ["Weather Trend", "Weather"],
            "_contenttype": "SavedContent",
            "_fields": [
                {
                    "ContentName": "Mid-west weather analysis",
                    "_analyzers": "nGram"
                }
            ],
            "_operation": "Create"
        },
        {
            "_id": "document_unique_id_2",
            "_keywords": ["Weather Analysis"],
            "_contenttype": "SavedContent",
            "_fields": [
                {
                    "ContentName": "Mid-east weather analysis",
                    "_analyzers": "nGram"
                }
            ],
            "_operation": "Create"
        }
    ]
}
```

What is claimed is:

1. A historian system comprising:
a processor;
a database storing content relating to a plurality of process devices within a process; and
a memory device coupled to the processor and further comprising processor-executable instructions stored in the memory device for, when executed by the processor:
receiving, at a client layer of the historian system, content descriptors for the content, the content descriptors comprising data values of one or more tags corresponding to the process devices within the process, the content descriptors describing the content, formatting, at the client layer of the historian system, the received content descriptors into a language-independent data format, queueing, at a service layer of the historian system, the formatted content descriptors in an indexing queue as messages, indexing, at the service layer of the historian system, according to an order of the indexing queue, the messages containing the formatted content descriptors in the database, the indexing comprising assigning a status descriptor to each message during each stage of the indexing, the indexing enabling the formatted content descriptors to be found in the database upon the status descriptor of a respective message being a stage corresponding to a successful indexing, the indexing enabling the stored content relating to a plurality of process devices to be selected and retrieved based on the found content descriptors;

dequeuing, at the service layer of the historian system, each message previously queued within the indexing queue from the indexing queue, the dequeuing of each message being enabled and performed upon the successful indexing of each message in the database; and providing the selected content corresponding to one or more of the process devices within the process based on the content descriptors found in the database.

2. The historian system of claim 1, wherein the content descriptors comprise at least one of a content name and a keyword annotation of content.

3. The historian system of claim 1, further comprising:
searching the indexed content descriptors in the database in response to requests; and
providing indexes of content descriptors stored in the database matching the requests.

4. The historian system of claim 3, further comprising providing a dashboard via a network connection, the dashboard comprising the selected content having one or more common content descriptors.

5. The historian system of claim 1, wherein the language-independent data format is a JavaScript Object Notation (JSON) format.

6. The historian system of claim 1, further comprising receiving the content descriptors and responding to requests via a network connection.

7. The historian system of claim 6, wherein the historian system is coupled to a plurality of client devices.

8. The historian system of claim 7, further comprising providing a dashboard to each of the plurality of client devices, the dashboard comprising content having one or more common content descriptors.

9. A method comprising:
storing, in a database, content relating to a plurality of process devices within a process;
receiving, at a client layer of a historian computing device, content descriptors for content, the content comprising data values of one or more tags corresponding to the process devices within the process, the content descriptors describing the content;
formatting, at a client layer of the historian computing device, the received content descriptors into a language-independent data format;
queueing, at a service layer of the historian computing device, the formatted content descriptors in an indexing queue as messages;
indexing, at the service layer of the historian system, according to an order of the indexing queue, the messages containing the formatted content descriptors in the database, the indexing comprising assigning a status descriptor to each message during each stage of the indexing, the indexing enabling the formatted content descriptors to be found in the database upon the status descriptor of a respective message being a stage corresponding to a successful indexing, the indexing enabling the stored content relating to a plurality of process devices to be selected and retrieved based on the found content descriptors;
dequeuing, at the service layer of the historian system, each message previously queued within the indexing queue from the indexing queue, the dequeuing of each message being enabled and performed upon the successful indexing of each message in the database; and
providing, by the historian computing device, the selected content corresponding to one or more of the process devices within the process based on the content descriptors found in the database.

10. The method of claim 9, wherein the content descriptors comprise at least one of a content name and a keyword annotation of content.

11. The method of claim 9, further comprising:
searching, by the historian computing device, the indexed content descriptors in the database in response to requests received via a communications network; and
providing indexes of content descriptors stored in the database matching the received requests.

12. The method of claim 11, further comprising providing, by the historian computing device, a dashboard comprising the selected content having one or more common content descriptors.

13. The method of claim 9, wherein the language-independent data format is a JavaScript Object Notation (JSON) format.

* * * * *